United States Patent [19]
Bobel, II et al.

[11] 3,919,531
[45] Nov. 11, 1975

[54] METHOD OF AND APPARATUS FOR INSPECTING THE CONTOURS OF MOVING BENT ARTICLES

[75] Inventors: Robert J. Bobel, II; Robert B. Kimura; Robert C. Pollex, all of Toledo, Ohio

[73] Assignee: Libbey-Owens-Ford Company, Toledo, Ohio

[22] Filed: May 16, 1974

[21] Appl. No.: 470,593

[52] U.S. Cl. .... 235/151.3; 235/92 QC; 235/151.13; 250/563; 356/237
[51] Int. Cl.² ............... G06F 15/20; G07C 3/14
[58] Field of Search ....... 235/151.3, 151.13, 92 PD, 235/92 QC, 92 CA; 250/552, 553, 562, 568, 571, 572, 574, 221, 223, 222 R, 224; 356/209, 212, 167, 168, 237; 178/DIG. 37

[56] References Cited
UNITED STATES PATENTS

| | | | |
|---|---|---|---|
| 3,588,480 | 6/1971 | Unger et al. .................. | 235/151.3 |
| 3,694,635 | 9/1972 | Hoetzel et al. ................. | 235/151.3 |
| 3,729,619 | 4/1973 | Laycak et al. .................. | 250/562 X |
| 3,743,431 | 7/1973 | Cushing et al. ................. | 250/572 X |
| 3,746,784 | 7/1973 | Van Oosterhout ............. | 250/562 X |

*Primary Examiner*—Joseph F. Ruggiero
*Attorney, Agent, or Firm*—Collins, Oberlin & Darr

[57] ABSTRACT

An inspection system for detecting the contour of a moving bent article, including a stationary collimated light beam directed at approximately normal incidence toward a horizontal path along which the article moves so that the direction of the beam reflected from the article will change in accordance with the contour or curvature of the article. A stationary array of light detection devices positioned so as to intercept the reflected beam detects the various positions of the reflected light beam and generates a series of signals in response thereto. These signals in the order in which they are produced, are processed and converted into a predetermined logic indicative of the surface contour of the bent article for comparison to a like logic for a prescribed contour.

23 Claims, 3 Drawing Figures

METHOD OF AND APPARATUS FOR INSPECTING THE CONTOURS OF MOVING BENT ARTICLES

BACKGROUND OF THE INVENTION

1. Field of the Invention

This invention generally relates to the field of inspection and, more particularly, to a method of and apparatus for inspecting the contour of a curved article. 2. Description of the Prior Art In the process of forming bent articles from flat sheets, such as automotive windshields and backlights made from sheet glass which must be heated and bent to rather precisely defined curvatures, it is important to know that they are dimensionally within prescribed tolerances to assure that the mounting thereof will not impose any tension or strain thereupon. Since production of the bent articles is on a continuous basis and at a rapid rate, it is desirable to detect imperfect articles as they are produced so that corrective measures may be taken immediately and before the accumulation of any substantial quantity of imperfect or scrap articles.

Heretofore, current methods of inspection such as placing a sample bent article on a master form and measuring the deviation between the article and the master form, only permit measurements of the article to be made after the article is bent and cooled, which creates an extended time lag of the information from the inspection operation to the forming operation. As a result, a considerable number of defective articles will have been produced if the bent articles are outside the dimensional tolerances.

Accordingly, it is desirable to be able to continuously inspect the glass articles during their forming stage to detect any developing patterns of bending which may be outside of prescribed dimensional tolerances so that corrective action can be immediately and/or automatically taken to prevent the production of any defective articles.

SUMMARY OF THE INVENTION

In accordance with this invention, an array of light detection devices detects the contour slope of a bent article continuously along a scanning line, which may be analyzed to give surface curvature within the furnace where the articles are actually heated and bent. The signals generated by the light detection devices are assembled into totals or continuously processed and displayed in the order that they are produced by the reflected beam movement for conversion into a signal representing the depth of the bend or into a graphical record of the curvature of the bent article.

Thus, the method for observing and measuring the curvature of a bent article generally comprises the steps of directing a collimated light beam toward a defined path, moving the bent article along the defined path beneath and with its surface substantially normal to the directed light beam to continuously reflect the directed light beam onto the array of light detection devices, sensing the position of the reflected light beam on the array and converting the sensed positions of the reflected light beams into useful logic.

The apparatus employed to practice this method generally comprises a laser source for generating a collimated beam of light which is positioned above and directed perpendicularly toward a conveyor for moving bent articles along a path through the light beam, an array of light detection devices positioned above and in a plane parallel to the conveyor for sensing the position of the light beam reflected from the surface of the bent article, and an electronic network for converting the sensed positions of the reflected light beam into either a signal representing the depth of curvature of the bent article or a graphical record of the contour curvature. Also, there may be provided devices such as signal lights or strip chart recorders for visually indicating or recording a graphical trace of the curvature of the bent article, respectively.

OBJECTS AND ADVANTAGES

It is therefore an object of this invention to provide a method and apparatus for automatic contour inspection of moving bent articles.

Another object of this invention is to provide a method of and apparatus for detecting developing patterns of curvature in bent articles as they are formed.

Another object of this invention is to provide a method of an apparatus for determining the contour of a bent article and comparing it to a prescribed contour.

Yet another object of this invention is to measure the magnitude of the deviation of an observed contour from a prescribed curvature to assure that the observed contour is within prescribed dimensional tolerances.

Still another object of this invention is to trace an observed curvature for comparison with a trace of a prescribed curvature.

Other objects and advantages will become more apparent during the course of the following description when taken in connection with the accompanying drawings.

BRIEF DESCRIPTION OF THE DRAWINGS

In the drawings wherein like numerals are employed to designate like parts throughout the same.

DETAILED DESCRIPTION OF THE PREFERRED EMBODIMENTS

For convenience, the invention will be described in conjunction with bent articles formed from sheets of glass such as automotive windows which may be continuously and rapidly produced by first heating flat sheets of glass in a bending furnace and then shaping the heated sheets by any of the well-known forming operations such as gravity, inertia, or press bending.

Figure 1:
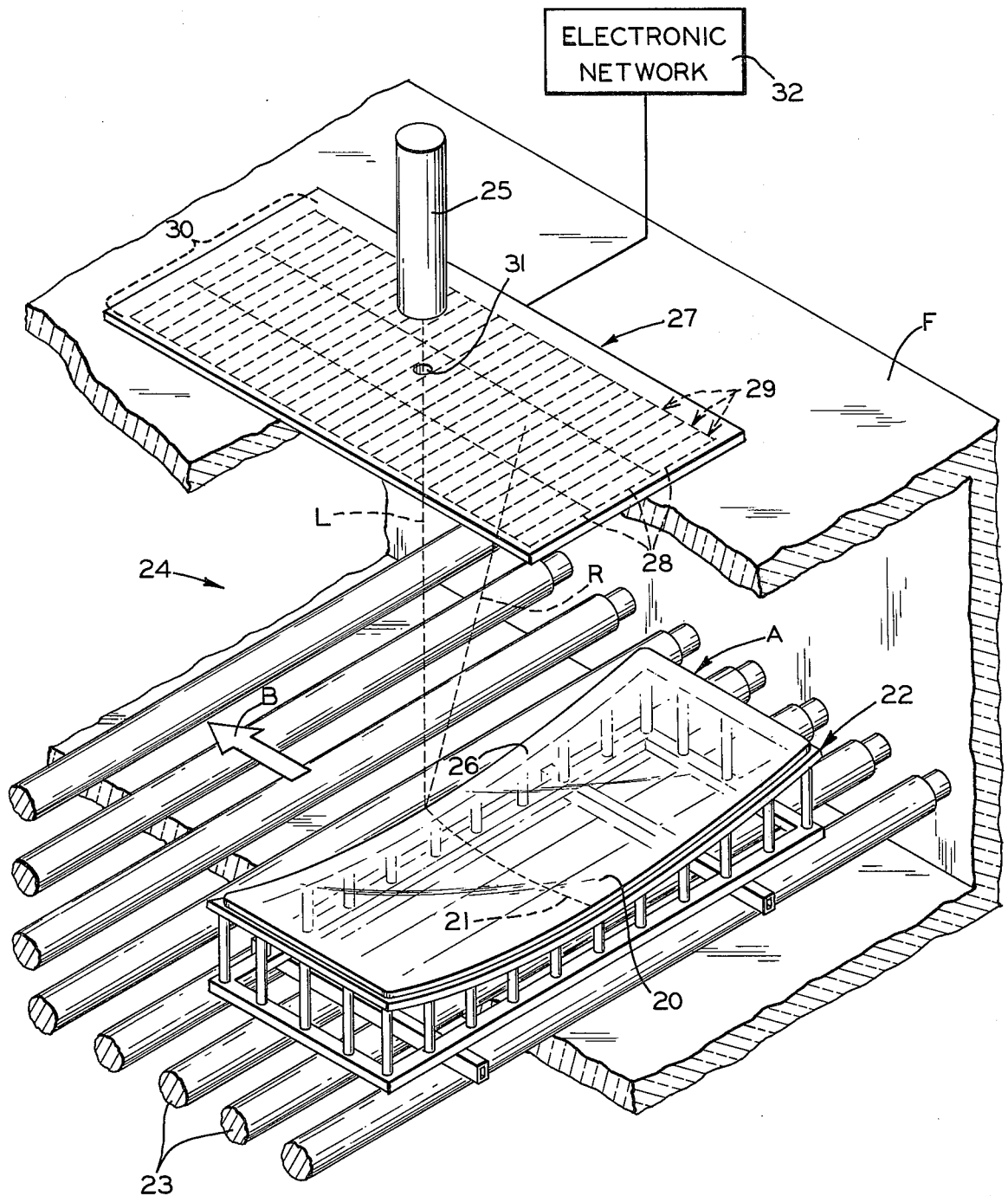
FIG. 1 is a schematic view illustrating one manner of directing a beam of collimated light along a line on a moving bent articles where the direction of the reflected light beam is a function of the contour of the bent article according to this invention.

Referring to FIG. 1, the bent article generally indicated by the letter A may comprise a central area 20 curved about a transverse line 21 over the entire length thereof. During bending the central area 20 may also develop a curvature along the transverse line 21 which curvature is commonly referred to as "crossbend" and which, in many instances, is undesirable. It is most desirable to inspect the curvature of the article A along the transverse line 21. Althouth the apparatus disclosed herein is set up for determining the curvature of the bent article A along its central transverse line 21, it will be apparent that the invention also can be employed for determining the curvature of the article A in areas other than along its central transverse axis 21.

Generally speaking, the bent articles A are formed on molds 22 by passing a continuing succession of the molds through a conventional bending furnace F along a defined path on conveyor rolls 23 in the direction of arrow B, see FIG. 1, and through an inspection zone 24 adjacent to or even within the furnace as diagrammatically shown in FIG. 1. The inspection zone 24 is provided with a stationary light source which may be a laser device 25 directed desirably, but not necessarily, perpendicular to and towards the defined path for focusing a collimated beam of light, i.e., one having parallel rays, at a point on the path. It should be noted that the upper surface 26 of the bent article A lies in a plane perpendicular with respect to the collimated light beam L. As shown in FIG. 1, when the article A is moved through the directed light beam L, the beam L produces a reflected beam R whose direction of reflection is a function of the angle of impingement on the upper surface 26 of the article — in this instance — along the transverse line 21. It can be readily observed in FIG. 1 that the angle of reflection developed by the directed light beam L and the upper surface 26 of the article A will change as different portions of the contour of the moving article A are passed through the light beam L.

A stationary array 27 of light detection devices such as photocells 28 is located in the inspection zone 24 in a position to monitor all movements of the reflected beam R. In the case as herein disclosed, when the light beam L is directed perpendicularly to the defined path, the array 27 is located in a plane parallel to the defined path and surrounds the light beam L. Still referring to FIG. 1, the array 27 generally comprises a plurality of longitudinally aligned rows 29 of discrete photocell batteries 30, each row consisting of three photocells 28 serially connected together to function as a single unit, and has an opening 31 in its center region for the passage of the directed light beam L. In this arrangement, the array 27 can monitor all anticipated movements of the reflected light beam R in either longitudinally direction from a 90° angle of incidence, as well as assure that the beam R will fall on the array 27 if it should be laterally deflected due to the curvature of the surface 26 in its longitudinal direction.

Briefly reviewing this aspect of the invention, the stationary laser beam L is directed perpendicularly toward an article A moving along the defined path to continuously reflect the light beam R from its curved upper surface 26. The reflected beam R will fall upon the array 27 to be sensed by one or more of the photocell batteries 30 depending upon the angle of incidence of the light beam L due to the contour slope of the bent article A at the point of impingement. For example, when "crossbend" occurs in a bent article and as the leading edge of the article A is moved beneath the laser beam L, the reflected beam R will be deflected by the contour of the article A at this point to fall upon the downstream side of the array 27 as viewed in FIG. 1. Continued movement of the article A will cause the angle of reflection to increase until the radius of the curvature of the crossbend and the path of the laser beam L lie in the same vertical plane at which point the path of the reflected beam R and the light beam L coincide. Further movement of the article A in the direction of arrow B will cause the angle of reflection to decrease so that the reflected beam R will fall upon the upstream side of the array 27. The signals produced by the photocell batteries 30 triggered by movement of the reflected beam R are then converted to a usable logic by an electronic network 32 for example, indicating the depth of the curvature or the contour of the article A occurring along an observed line on the article A.

Generally speaking, the electronic network 32, composed of a novel arrangement of commercially available devices, may be conveniently arranged into three component circuits, namely a signal recognition circuit 33 for monitoring the photocell batteries 30 in the order they are energized, a signal counting circuit 34 for counting the number of photocell batteries 30 energized which is directly related to the curvature depth of bend of the bent article, and a signal processing circuit 35 for converting the counted number of energized photocells into a suitable logic form for comparison to a like logic of a prescribed curvature. Desirably, these circuits should provide for the following functions to (1) monitor the position of the reflected beam R as it moves across the photocell batteries 30 by continuously accumulating data as to which of the batteries were energized, (2) store the accumulated data until the bent article traverses the directed laser light beam L, (3) convert the stored data into either a numerical logic or form to make a graphical record of an observed curvature, (4) compare the numerical logic with a prescribed value range having high and low limits and, if necessary, (5) compensate the data as it is processed for stray signals which may occur if the article A is misaligned with respect to the directed light beam.

Figure 2:
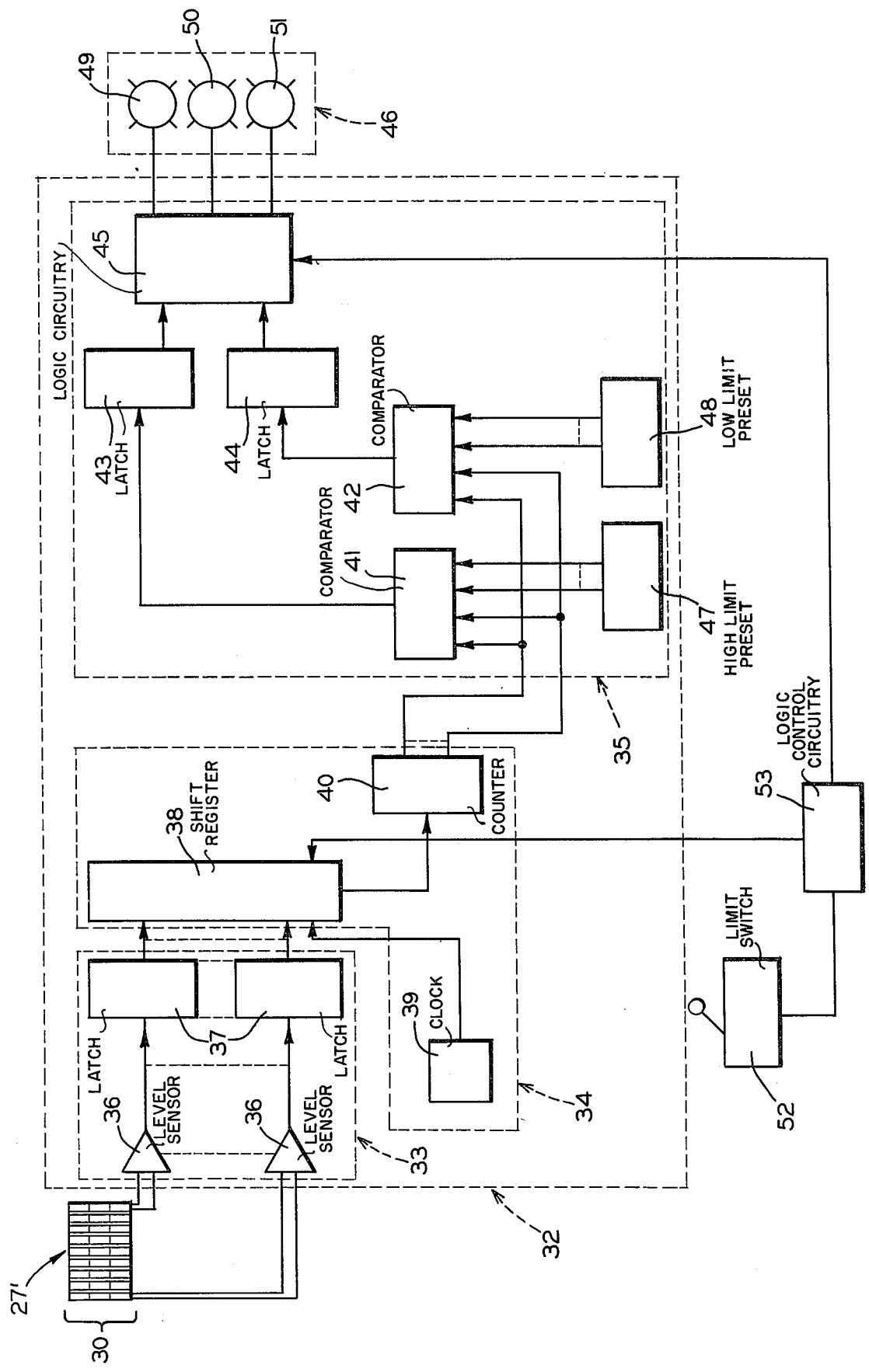
FIG. 2 is a diagrammatic block view of an embodiment of this invention employing electronic devices for converting the sensed number of signals into a form indicative of the depth of the curvature of a bent article.

Referring now to FIG. 2 wherein the bent articles A to be inspected are simply curved, i.e., bent about only one axis, such as automotive backlights, the depth of the curvature or crossbend along the line 21 can be measured to see if the article A is within prescribed dimensional tolerances. Thus, a numerical value based on the number of photocell batteries 30 energized as the light beam scans across the article may be employed, and only an appropriate number of points spaced along the line 21 need be sensed to obtain a numerical value which is indicative of the depth of the crossbend for comparison to a prescribed value. Since continuous updating off the data required for evaluation is not necessary, the rows 29 of discrete photocell batteries 30 may be arranged in spaced apart relationship as diagrammatically shown in the array 27' of FIG. 2.

In this embodiment of the invention, the signal recognition circuit 33 comprises a level sensor 36 and a latch 37 for each discrete photocell battery 30. The signal voltage output of each energized photocell battery 30 is transmitted to its associated level sensor 36 to provide a signal to its associated latch 37. Each energized latch 37 changes its state when its associated level sensor 36 changes its state and accumulates and stores the signals generated by the energized photocell batteries 30 for the signal counting circuit 34 until the bent article A has traversed the laser beam L.

After the bent article A has traversed the laser beam L, the stored signals of the energized latches 37 are transmitted to a shift register 38 in the signal counting circuit 34 which also includes a flip-flop clock 39 and a binary counter 40. The signal outputs of the energized latches 37 are transmitted to the shift register 38 in parallel form by means of the flip-flop clock 39, which clocks the signal outputs into the binary counter 40 in a manner such that the signals are shifted one at a time. The binary counter 40 converts the signals of the latches 37 whose states have been changed into a numerical value which, of course, corresponds to the number of photocells 30 which have been energized during the traverse of the bent article A beneath the laser beam L.

The signal output of the counter 40 is then transmitted to a pair of binary comparators 41 and 42 of the signal processing circuit 35, which also includes a pair of latches 43 and 44 for receiving signals from the comparators 41 and 42, respectively, and a logic circuitry 45 for directing these signals to a visual display apparatus 46.

Since it is desired to compare the numerical value of the signals obtained from the array 27' of photocell batteries 30 within prescribed limits, the comparators 41 and 42 are provided with means 47 and 48 to preset them with high and low values, respectively. If the signal output from the counter 40 has a numerical value higher than the preset value in the comparator 41, the comparator will transmit a signal to its associated latch 43. On the other hand, if the value of the signal from the counter 40 is less than the preset value of the high limit comparator 41 but greater than the prescribed value of the low limit comparator 42, the comparator will transmit a signal to its associated latch 44.

Still referring to FIG. 2, the signal output, if any, of the high and low latches 43 and 44, respectively, are transmitted to the logic circuitry 45 which, in turn, transmits an appropriate signal to a high limit indicating lamp 49, a nominal indicating lamp 50 or a low limit indicating lamp 51 of the visual display apparatus 46. Thus, if the logic state of the latch 43 is changed, the network circuitry 45 directs a signal to and lights the high limit lamp 49, thereby indicating that the curvature of the crossbend of the article A is greater than a prescribed dimensional tolerance. On the other hand, if only the logic state of the latch 44 is changed, the network circuitry 45 directs a signal to and lights the nominal lamp 50, thereby indicating that the curvature of the crossbend is within dimensional tolerances. If network of the latches 43 and 44 changes its state, the logic network 45 directs a signal to and lights the low limit lamp 51, thereby indicating that the curvature of the crossbend of the article A is less than its prescribed dimensional tolerance.

In order to reset and prepare the electronic network 32 to receive data for indicating the depth of bend of a curved article A, a limit switch 52 actuated by the mold 22 just before the leading edge of the article A passes through the light beam L, triggers a logic control device 53 which has its output connected to the shift register 38 and logic circuitry 45 for clearing the shift register 38 and extinguishing the lighted signal lamp 49, 50 or 51.

Summarizing briefly, the level sensors 36 receive signals from their associated energized photocell batteries 30 and change the logic states of their respective latches 37. The triggered latches 37 retain the data as to which photocell batteries 30 were energized until the article A traverses the laser beam L, at which time the data held by the latches 37 is transmitted to the shift register 38. The data is then transmitted to the binary counter 40 at a timed rate by the clock 39. The counter 40 counts the number of photocell batteries 30 energized as article A traversed the laser beam L, which counted number is directly proportional to the depth of the bend of the bent article A. The numerical value of the energized photocell batteries 30 is then compared with the preset high and low values set in the comparators 41 and 42. Then, depending upon the relationship of a numerical value of the energized photocell batteries 30 with the preset high and low limits, a signal is sent to the logic circuitry 45 which transmits a signal to illuminate the appropriate lamp 49, 50 or 51.

Figure 3:
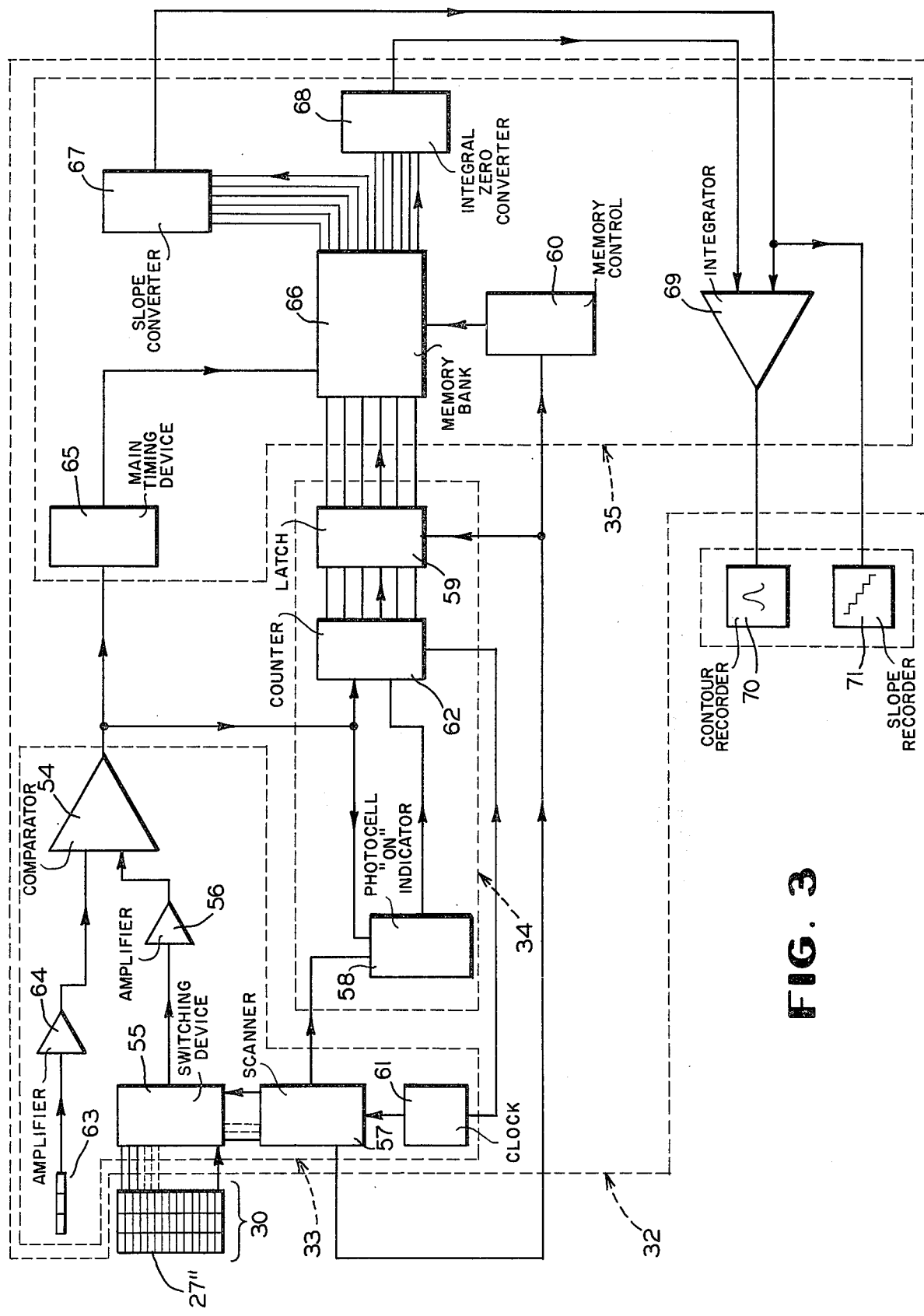
FIG. 3 is a diagrammatic block view of another embodiment of this invention employing electronic devices for converting the continuously observed and sensed signals into a logic for making a trace of the curvature in a graphical form.

In the case where the bent articles A have compound curved surfaces such as automotive windshields, i.e., the glass sheet is intentionally bent about both major axes, it is desirable to graphically depict the contour of the article A along the line 21. Thus, in the array 27" of discrete photocell batteries 30, the photocell batteries are arranged in close side-by-side relationship as diagrammatically shown in FIG. 3 for continuously sensing the reflected light beam R as it changes position on the array 27" because of the changing contour of the article A being inspected.

In this embodiment of the invention, the signal recognition circuit 33 includes means for activating the electronic network 32 only when articles A are traversing the directed light beam L. One method for activating the network 32 is to compare two voltages whose difference is a function of the light level of the reflected light beam R. Thus, the signal recognition circuit 33 includes a comparator 54 which compares two voltages, one obtained from the light detection array 27" and the other from a single photocell battery 63 which detects only the ambient light which strikes the array 27".

A continuous series of voltage signals is transmitted from the array 27" of photocell batteries 30 via a switching device 55 and an amplifier 56. Each discrete photocell battery 30 is connected to a solid state switch (not shown) of the switching device 55. The output signal of a triggered switch is transmitted to the amplifier 56 which converts the output signal from the energized photocells 30 to a usable voltage magnitude. The output signal from the amplifier is then transmitted to the comparator 54.

A scanner 57 connected to the switching device 55 closes each switch in the device 55 in a predetermined sequence and only closes one switch at any given instant of time. Since solid state switches are used, each switch can be closed in order at high speed and the comparator 54 can check for reflections of the beams R on all photocell batteries 30 in the array 27" in a fraction of a second. At the same time, and for reasons described hereinafter, the output from the scanner 57 is also transmitted to a photocell "on" indicator 58, a latch 59, and a memory control device 60. A clock 61 connected to the scanner 57 controls the rate at which the scanner 57 switches the switching device 55 and, at the same time and for reasons to be described hereinafter, the output from the clock 61 is also transmitted to a counter 62.

The ambient light photocell battery or ambient light detector 63 is positioned to detect the background light striking the photocell array 27", in this instance, the light of the bending furnace F in which the bent articles A are formed. The output voltage of the detector 63 is transmitted to the comparator 54 via an amplifier 64 which converts the voltage to a usable voltage magnitude.

The output signal from the comparator 54, which changes when the reflected light beam R energizes the various photocell batteries 30, is simultaneously transmitted to the counter 62 and the photocells on indicator 58. Also, for reasons described hereinafter, the output from the comparator 54 is also conducted to a main timing device 65.

Referring now to the signal count circuit 34 which, in this embodiment, generally comprises the photocell on indicator 58, the counter 62 and the latch 59, the counter 62 receives signals from the comparator 54 and the indicator 58 for keeping track of the energized photocell batteries 30. This is made possible since the counter 62 and the scanner 57 are controlled by the same clock 61. As previously indicated, the indicator 58 receives a signal from the scanner 57 as well as the comparator 54 so that its output signal is a function of both of these elements. The main function of the indicator 58 is to monitor the number of photocell batteries 30 that are simultaneously energized by the reflected light beam R which can be either one, two or three of the batteries 30 for compensating the counter's 62 output when more than one photocell battery 30 is energized at any instant in time. The latch 59 interfaces the output of the counter 62 to a memory bank 66 which stores the signals generated by the reflected beam's R pattern in digital form for subsequent recall and processing.

As indicated in the signal processing circuit 35, the memory bank 66 is controlled by the memory control device 60 which controls the memory bank 66 as to the rate at which it should accept signals from the latch 59 and transmit stored signals therefrom, as well as the main timing device 65 which starts and stops the processing of signals by the memory bank 66. The output signals from the memory bank 66 are transmitted to a slope output digital-to-analog converter 67 which converts the digital form output of the memory bank 66 to an analog form output. As previously indicated, the bent articles A are conveyed through the inspection zone 24 on molds 22 in a substantial horizontal plane and thus the upper surface 26 of the bent articles are aligned perpendicularly to the laser beam L. However, due to the construction and handling of the molds 22 the bent articles may be displaced from the horizontal plane as they are conveyed beneath the laser beam L. This misalignment may cause the reflected light beam R pattern to be displaced on the array 27''. Therefore, the output signals from the memory bank 66 are transmitted to an integral zero digital-to-analog converter 68 which compensates for any displaced signals transmitted to an integrator 69 due to misalignment of the bent article A with respect to the laser beam L. The signal outputs of the converters 67 and 68 are transmitted to the integrator 69 which integrates the two analog signals to form a contour output signal which, in turn, is graphically reproduced on a pen recorder 70 for plotting a curve which is equivalent to the curvature of the bent article A. Also, if desired, the slope output signal from the converter 67 may be directly transmitted to a pen recorder 71 for graphically reproducing a line which is equivalent to the slope of the curvature of the bent article A.

It is to be understood that the form of the invention herein shown and described is to be taken as an illustrative embodiment only of the same and that various changes in the shape, size, and arrangements of the parts as well as various procedural changes may be resorted to without departing from the spirit of the invention or the scope of the subjoined claims.

We claim:

1. In an apparatus for determining the contour of moving bent sheet articles utilizing a light beam reflected from said article, the improvement comprising:
    a. an array of parallelly arranged contacting light detection devices located in a plane parallel to and along a line in the direction of travel of said bent article with each detection device producing a signal when it is illuminated by said reflected light beam from said moving article;
    b. an individual light detection device for producing a signal from an ambient light source;
    c. a comparator for comparing the signals produced by said array and said ambient light detection device for producing a signal;
    d. a binary counter for counting and keeping track of the signals produced by the particular light detection devices illuminated in said array;
    e. a memory device for storing the signals generated by the reflected light beam pattern in digital form;
    f. a converter for converting the signals in digital form to analog form;
    g. an integrator for changing the signals from slope form to contour form; and
    h. a display device for displaying the signals in a plotted form on a chart.

2. An apparatus for determining the contour of a bent article as claimed in claim 1, including a switching network and a scanner for closing the switching network in predetermined order.

3. An apparatus for determining the contour of a bent article as claimed in claim 2, including an amplifier in each light sensing circuit for amplifying the signals produced by each light detection device.

4. An apparatus for determining the contour of a bent article as claimed in claim 3, including a clock for timing the rate at which said scanner and counter receives signals.

5. An apparatus for determining the contour of a bent article as claimed in claim 1, including a timing device and a control device for controlling said memory.

6. An apparatus for determining the contour of a bent article as claimed in claim 1, including a second converter for compensating the signals for misalignment of the bent article and the directed light beam.

7. In a method of determining the contour of a bent sheet article moving along a defined path by intercepting a reflected light beam whose direction changes as it is reflected from the bent article, the improvement comprising the steps of:
    a. directing a stationary collimated light beam toward the defined path;
    b. moving said bent article along said defined path through said light beam for continuously reflecting said light beam from and along a desired line on said bent article which extends in a plane parallel to the defined path as said article moves therealong;
    c. intercepting said reflected light beam as it changes direction from along said desired line by individual ones of an array of light detection devices to produce a series of signals;
    d. monitoring said series of signals in the order they are produced by said individual ones of said array of light detection devices;

c. accumulating and storing said series of signals until said article has traversed said stationary light beam, and f. releasing and processing said stored series of signals into a predetermined logic subsequent to said article traversing said directed light beam.

8. A method of determining the contour of a bent sheet article as claimed in claim 7, wherein said collimated light beam is a laser beam.

9. A method of determining the contour of a bent sheet article as claimed in claim 7, wherein the processing step includes a step of digitally counting the number of signals produced and converting this number of signals into a predetermined logic.

10. A method of determining the contour of a bent sheet article as claimed in claim 9, including the step of comparing the value of said counted number of signals with prescribed high and low number values for determining whether the curvature of said bent article is within a prescribed range.

11. A method of determining the contour of a bent sheet article as claimed in claim 10, including the step of displaying the compared numerical value for visually indicating whether said counted number of signals is between said prescribed high and low number values.

12. A method of determining the contour of a bent sheet article as claimed in claim 7, including the step of compensating for misalignment of said bent sheet article with said directed light beam.

13. A method of determining the contour of a bent sheet article as claimed in claim 9, wherein the converting step is characterized by the fact that the digital form of the number is changed into analog form for recording on a strip chart.

14. In an apparatus for determining the contour of a bent sheet article moving along a defined path by intercepting a reflected light beam whose direction changes as it is reflected from the bent article, the improvement comprising:
a. means for directing a stationary collimated light beam towards said defined path;
b. means for moving said bent article along said defined path through said collimated light beam for continuously reflecting said light beam from and along a desired line on said bent article which extends in a plane parallel to the defined path as said article is moved therealong;
c. an array of light detection devices intercepting said reflected light beam as it changes its direction from and along said desired line for producing a series of signals in response thereto, and
d. a logic network connected to said array of light detection devices for processing the series of signals into a predetermined logic indicative of the contour of the bent article, wherein said logic network includes means for accumulating and storing said series of signals in the order they are produced until said bent article has traversed the light beam, means for counting said series of signals, and means for processing said counted signals into a predetermined logic representing the contour of said bent article.

15. An apparatus for determining a contour of a bent article as claimed in claim 14, wherein said light directing means is positioned above said path so as to direct said light beam perpendicular to said defined path and said light detection array is positioned in a plane above and parallel to said defined path for intercepting said reflected light beam.

16. An apparatus for determining the contour of a bent article as claimed in claim 14, wherein said light generating means is a laser beam source.

17. An apparatus for determining the contour of a bent article as claimed in claim 14, wherein said light detection array comprises a plurality of rows of spaced apart photocells extending longitudinally along said defined path.

18. An apparatus for determining the contour of a bent article as claimed in claim 14, wherein said light detection array comprises a plurality of rows of contacting photocells longitudinally extending along said defined path.

19. In an apparatus for determining the contour of a moving bent sheet article wherein a collimated light beam is directed toward said article and the light beam reflected therefrom changes its position in accordance with the contour of said bent article, the improvement comprising:
a. an array of parallelly arranged spaced apart light detection devices located in a plane parallel to and along a line in the direction of travel of said article for intercepting the changing direction of the reflected light beam with each detection device producing a signal when it is energized by said reflected light beam;
b. a latch for accumulating and storing signals from said light detection devices in the order they are produced by said detection devices;
c. a shift register for receiving said signals in parallel form from said latches in the order they are produced;
d. a binary counter for receiving and counting the signals transmitted from said shift register;
e. a comparator for receiving said counted signals from said counter and including means for setting prescribed high and low value limits therein for comparing the value of the counted number of signals with said prescribed high and low value limits, and
f. display means for displaying the state of the compared value with respect to the prescribed values.

20. An apparatus for determining the contour of a bent article as claimed in claim 18, including a clock connected to said shift register for shifting the signals one at a time from said shift register to said counter.

21. An apparatus for determining the contour of a bent article as claimed in claim 18, including a light display device having three lamps, one for indicating a produced value above the high preset value, one for indicating a produced value within the prescribed high and low values, and one for indicating the produced value below the prescribed low value.

22. An apparatus for determining the contour of a bent article as claimed in claim 21, including a latch and a logic circuit for transmitting a signal to the appropriate lamp.

23. An apparatus for determining a contour of a bent article as claimed in claim 22, including an enabling device for resetting said shift register and extinguishing said lamps.

* * * * *

UNITED STATES PATENT OFFICE
CERTIFICATE OF CORRECTION

PATENT NO. : 3,919,531

DATED : November 11, 1975

INVENTOR(S) : Robert J. Bobel, II, et al

It is certified that error appears in the above-identified patent and that said Letters Patent are hereby corrected as shown below:

Col. 2, line 20, "an" should be --and--
       line 39, "articles" should be --article--
Col. 3, line 2, "althouth" should be --although--
Col. 5, lines 46 and 47, "network" should be --neither--
Col. 6, line 50, "beams" should be --beam--
Col. 10, line 48, "18" should be --19--
        line 52, "18" should be --19--

Signed and Sealed this twenty-fourth Day of February 1976

[SEAL]

Attest:

RUTH C. MASON
*Attesting Officer*

C. MARSHALL DANN
*Commissioner of Patents and Trademarks*